Nov. 7, 1950 W. F. DOUBLE 2,529,330
DOUBLE PLANETARY DRIVE AXLE
Filed Feb. 20, 1948
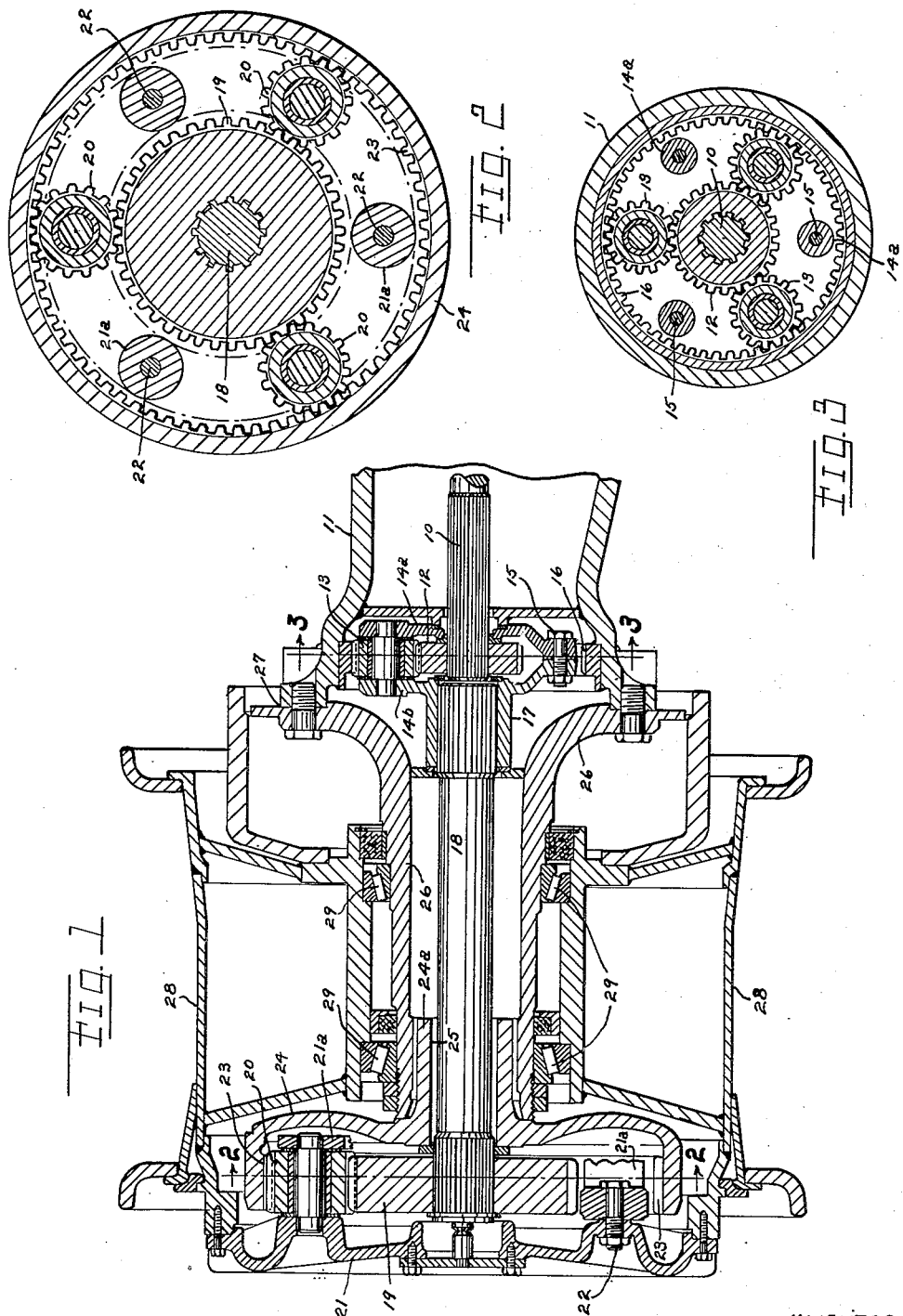
INVENTOR
WALTER F. DOUBLE
By Hyde, Meyer, Baldwin & Doran
ATTORNEYS Patented Nov. 7, 1950

2,529,330

UNITED STATES PATENT OFFICE 2,529,330

DOUBLE PLANETARY DRIVE AXLE

Walter F. Double, Wickliffe, Ohio, assignor to The Euclid Road Machinery Co., Cleveland, Ohio, a corporation of Ohio Application February 20, 1948, Serial No. 9,722

1 Claim. (Cl. 74—801)

The invention relates to novel and improved means for applying driving torque to the driving wheels of heavy duty vehicles such as trucks, tractors, and the like. It particularly relates to a novel and improved planetary gear drive for such driving wheels.

An object of the invention is to provide a pair of planetary gear units arranged in series, and adapted for incorporation in a driving wheel, through which units the driving torque is transferred in succession from the driving axle to the wheel.

A further object of the invention is to provide a cooperating pair of planetary gear units, as mentioned in the last preceding paragraph, whereby the tooth loads on the various gears are substantially reduced.

A further object of the invention is to provide a multiple planetary gear assembly adapted for incorporation in a driving wheel, whereby the torque input on the driving wheel is greatly increased while actually decreasing the tooth loads and strength requirements of the various individual gears.

Other objects and advantages will be apparent from a study of the following specification, in conjunction with the accompanying drawings, in which:

Fig. 1 is a vertical sectional view through a driving wheel hub embodying my invention; a fragmentary portion of the driving axle and its housing also appears in the drawing.

Figs. 2 and 3 are sectional views taken respectively on the lines 2—2 and 3—3 of Fig. 1.

Fig. 1 shows the outer end of the driving axle shaft 10 and its fixed housing 11. Axle 10 is driven from a conventional differential gearing, or otherwise, in familiar fashion.

The outer end of shaft 10 drives a primary set of planetary gearing. This includes a primary sun gear 12 splined on the outer end of axle shaft 10, and in mesh with a circumferentially spaced plurality of primary planet gears 13 carried by a rotatable gear cage or spider 14 which may conveniently be built up from outer and inner parts 14a and 14b secured to each other by studs 15. The planet gears 13 are also in mesh with a primary internal ring gear 16 fixed within the axle housing 11 opposite to or in the zone of the sun gear.

Inner half 14b of spider 14 has a boss 17 which is splined to the inner end of a floating stub shaft 18. It will be evident that rotation of axle 10 produces both rotation and revolution of the planet gears 13, thereby producing rotation of spider 14 and its boss 17, with consequent rotation of stub shaft 18.

The outer end of shaft 18 drives a secondary set of planetary gearing. As shown, shaft 18 is splined to a second sun gear 19 which meshes with a spaced plurality of secondary planet gears 20 carried on a hub cap disk 21.

Cap disk 21 likewise has an inner cooperating part 21a affixed to it by studs 22, part 21a being only indicated in fragmentary fashion in Fig. 1, for clarity in viewing other parts. Planetary gears 20 travel within an internal ring gear 23 fixed in a ring gear carrier 24 opposite to or in the zone of the sun gear 19. Carrier 24 has a boss 24a having an internal bore 25 to permit free passage of shaft 18. The outer periphery of boss 24a has a splined connection with a fixed member 26 which is attached at 27 to the axle housing 11 and in effect forms an end extension of said housing. Cap disk 21 is attached at its periphery to the conventional tire-receiving wheel drum 28, the structure being evident from a glance at Fig. 1. The hub of the drum 28 is rotatable on bearings 29 on member 26.

From what has been said it will be evident that the driving sequence proceeds from axle shaft 10 through sun gear 12, planet gears 13, spider 14, shaft 18, sun gear 19, planet gears 20, and disc 21 to drum 28. The outer or secondary planetary gear unit at the left on Fig. 1 is therefore in operational series with the inner or primary planetary gear unit at the right of Fig. 1, there being a gear reduction of moderate amount in each unit, the total gear reduction between axle 10 and drum 28 being of course the arithmetical product of the reduction in each unit. In an actual embodiment of the invention fairly accurately represented by the present drawings, the gear reduction in the inner planetary unit (right of Fig. 1) is 3.25 to 1 and in the outer planetary unit is 3.13 to 1, using relatively large and sturdy sun gears by reason of the lower reduction ratio. The differential gear reduction is 3.13 to 1. The total gear reduction in the driving axle is therefore about 28 to 1.

In a prior commercial embodiment with only one planetary unit, in order to get a gear reduction in the axle of only 20 to 1 it was necessary to have a planetary reduction of 5.2 to 1. This of course imposed a higher gear tooth load, and yet the total axle reduction was almost one-third less than achieved with lower tooth loads in two planetary units in series.

With my new double planetary arrangement it is possible to use a more powerful engine, and larger wheels and tires, so that I can actually secure a driving torque on the driving wheel of about double the value achieved with the prior single planetary arrangement.

What I claim is:

In a vehicle drive of the character described, the combination of a non-rotatable axle housing provided with fixed inner primary and outer secondary internal ring gears spaced longitudinally thereon, a power driven axle rotatable in said housing and provided with a primary sun gear in the zone of the inner ring gear, a primary set of planet gears, a stub shaft separate from and axially alined with the axle and rotatable within the housing and having a non-rotatable connection at its inner end with said primary set of planet gears meshing with both said primary sun gear and primary ring gear and having a non-rotatable connection at its outer end with a secondary sun gear in the zone of the secondary ring gear, a wheel hub journalled on the axle housing in the space between the two ring gears thereon and provided at its outer end with a support rotatable with said hub, and a secondary set of planet gears mounted upon said support and meshing with both said secondary sun gear and secondary ring gear, thus causing driving torque originating in the axle and transmitted to the wheel hub to traverse two planetary gear systems in succession, one between the outer end of the axle and the inner end of the stub shaft and the other between the outer end of the stub shaft and the wheel hub.

WALTER F. DOUBLE.

REFERENCES CITED

The following references are of record in the file of this patent:

UNITED STATES PATENTS

| Number | Name | Date |
|---|---|---|
| 1,224,109 | Sand | Apr. 24, 1917 |
| 1,320,530 | Buehler | Nov. 4, 1919 |
| 1,442,795 | Cook et al. | Jan. 23, 1923 |
| 1,678,798 | Asprooth et al. | July 31, 1928 |
| 2,424,578 | Mortag | July 29, 1947 |

FOREIGN PATENTS

| Number | Country | Date |
|---|---|---|
| 621,941 | France | May 19, 1927 |